July 3, 1945.  R. ATTI  2,379,419
MOLD CUTTING MACHINE AND THE LIKE
Filed Aug. 26, 1942  2 Sheets-Sheet 1
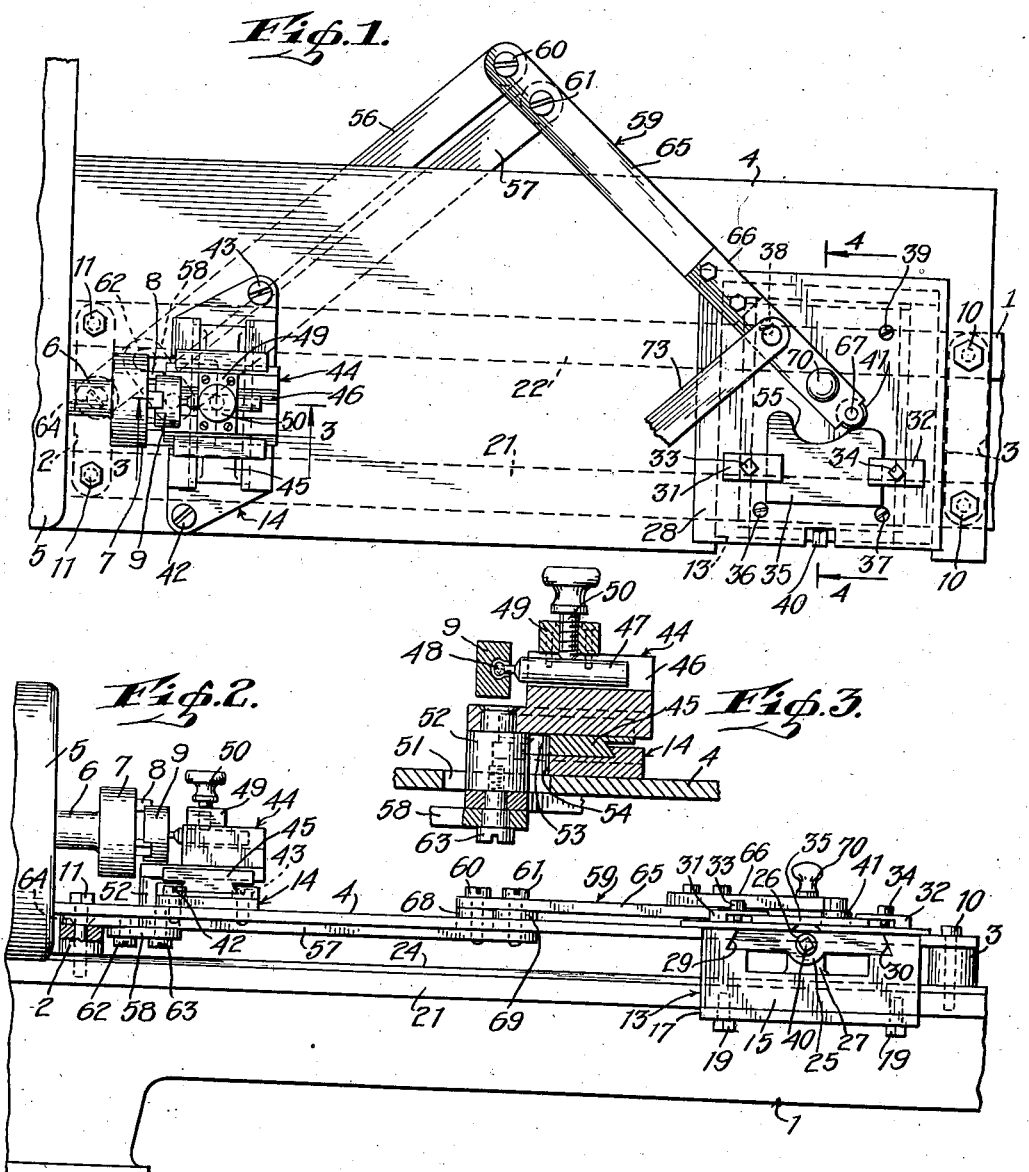
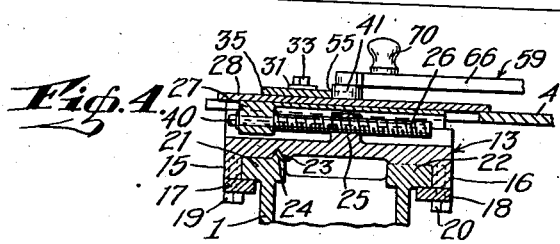
INVENTOR
RAPHAEL ATTI
BY Gustav Drews
ATTORNEY July 3, 1945.  R. ATTI  2,379,419
MOLD CUTTING MACHINE AND THE LIKE
Filed Aug. 26, 1942   2 Sheets-Sheet 2
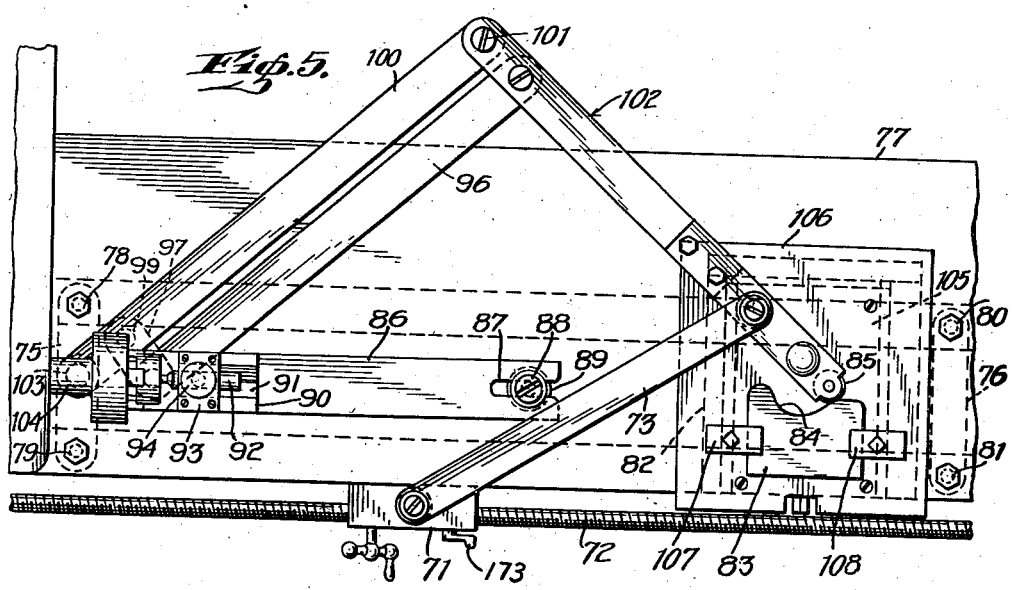
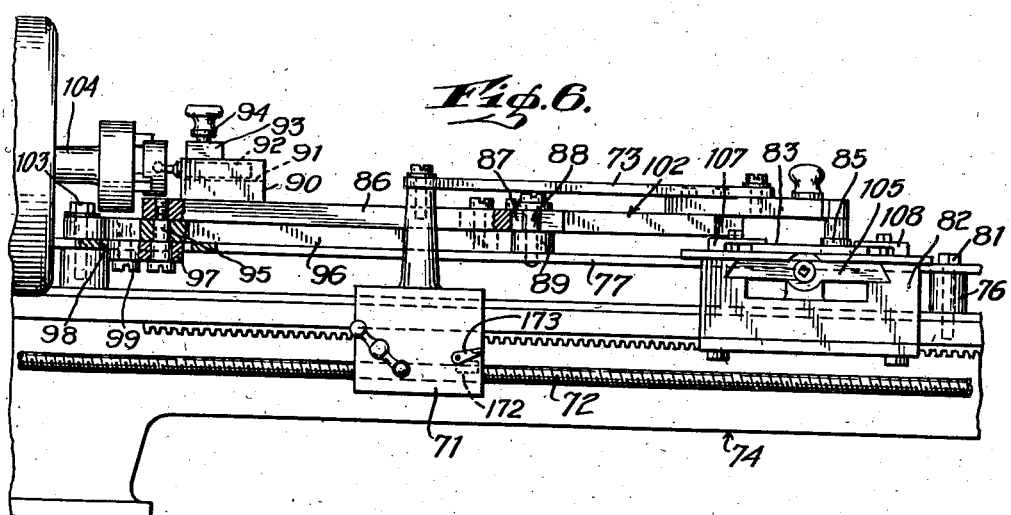
INVENTOR
RAPHAEL ATTI
BY
ATTORNEY Patented July 3, 1945

2,379,419

UNITED STATES PATENT OFFICE 2,379,419

MOLD CUTTING MACHINE AND THE LIKE

Raphael Atti, Cliffside Park, N. J.

Application August 26, 1942, Serial No. 456,138

10 Claims. (Cl. 82—14)

This invention relates in general to mold cutting machines and the like and more particularly to a machine for forming a mold having an arcuate surface of various radii.

Among the objects of the present invention it is aimed to provide an improved mold cutting machine for forming a mold having an arcuate surface of varying diameters.

It is still further an object of the present invention to provide an improved precision mold cutting machine for forming molds which require predetermined precise forms, such as an instance as is necessary in the manufacture of contour forming molds, precision parts and reproductions in general.

These and other features, capabilities and advantages of the invention will appear from the subjoined detail description of specific embodiments thereof illustrated in the accompanying drawings in which Figure 1 is a plan of a part of a machine made according to one embodiment of the present invention.

Fig. 2 is a fragmental side elevation of the embodiment illustrated in Fig. 1.

Fig. 3 is a section on the line 3—3 of Fig. 1.

Fig. 4 is a section on the line 4—4 of Fig. 1.

Fig. 5 is a plan of a part of a machine made according to another embodiment of the invention.

Fig. 6 is a fragmental side elevation of the embodiment illustrated in Fig. 5.

In the present invention advantage is taken of the principle disclosed by the applicant in his prior Patent No. 2,030,850 for Grinding precision tools. As an instance, in the present invention advantage is taken of that principle to produce precision molds, precision parts and reproductions in general.

According to the embodiment illustrated in Figs. 1 to 4, inclusive, the frame 1 is typical of a standard lathe having a bed to which are secured the two spacing bars 2 and 3 for supporting the plate 4. The frame 1 has at one end thereof the conventional head 5 from which extends the main spindle 6 having the work receiving chuck 7 with the chuck jaws 8 for receiving the blank 9 to be cut. On the plate 4 the device now to be described and constituting the main part of the present invention is mounted. The plate 4 is secured to the spacing bar 3 by the screws 10. The plate 4 is also connected to the spacing bar 2 by the screws 11, the screws 10 and 11 extending through the plate 4 and spacing bars 3 and 2 respectively into the bed plate of the frame 1 not only to secure the plate 4 in place but also to secure the spacing bars 3 and 2 in place. Adjacent to the spacing bar 3 there is provided the master supporting base 13, secured to the frame 1. Adjacent to the spacing bar 2 and mounted on the plate 4 there is provided the tool supporting base or platform 14.

The master forming base 13 consists essentially of a bracket having downwardly extending portions 15 and 16 to which are secured the strips 17 and 18 by the screws 19 and 20 respectively, which clamp the base 13 to the oppositely extending flanges 21 and 22 of the bed plate of the frame 1. This base 13 also preferably as shown has a slot 23 to receive the raised portion 24 on the frame 1 to facilitate sliding the base 13 along the frame 1 and aid in positioning the same. The base 13 has a journal 25 for receiving the screw 26 rotatably mounted in the extension 27 extending downwardly from the plate 28. The extension 27, see Fig. 2, has inclined edges to ride in the bayonet slot portions 29 and 30 of the base 13. The plate 28, see Figs. 1 and 2, has two arms 31 and 32 provided with the screws 33 and 34 respectively, extending through the arms 31 and 32 into the plate 28 to serve as jaws for clamping the master 35 on the plate 28. As shown the plate 28 is secured to the base 13 by four screws 36, 37, 38, and 39. The adjusting screw 26 is provided with an angular wrench receiving head 40 disposed on the outside of the extension 27, as particularly shown in Figs. 1 and 4. The engagement of the head 24 and actuation thereof to turn the screw 26 is provided to position the plate 28 with the master 35 relative to the stylus wheel 41 or a center line.

The base 14 of this embodiment is secured to the plate 4 by the screws 42 and 43. To this base 14 the tool receiving head 44 is connected by a slide 45 to afford universal movement, the slide 45 being slidably connected by slideways to the base 14 to slide transversely of the bed plate of the frame 1 and slidably connected to the head 44 by slideways to afford longitudinal movement of the head 44 relative to the bed plate of the frame 1. The head 44, in the present instance, has a V-shaped slot 46 to receive the shank 47 of the cutting tool in the present instance and preferably provided with a substantially round cutting head 48. A cross piece 49 is secured to the head 44, extending across the slot 46 into which extends the set screw 50 to engage the shank 47 and anchor it in position in the head 44. The plate 4, as shown in Fig. 3, is provided with an opening 51 to enable the pin 52 connected to the head 44 to extend down through the plate 4 and below it. Similarly the slide 45 is provided with an opening 53 and the base 14 is provided with an opening 54 substantially in alinement with one another and to afford clearance for the pin 52 in its movements hereinafter to be described. The master 35 in the present instance consists essentially of a flat steel plate having the design cut on the edge 55 facing the stylus wheel 41. The pantographic device now to be described embraces a device for moving the head 44 by means of the pin 52 relative to the position of the stylus wheel 41 on the design face 55 of the master 35. This device consists essentially of a long arm 56, a short arm 57, a connecting link 58, and a control arm 59. One end of the arm 56 is connected to one end of the arm 59 by the pin 60. One end of the arm 57 is connected to the arm 59 a short distance from the pin 60 by the pin 61. The link 58 is provided with two pin openings the centers of which are spaced from one another a distance equal to the distance between the centers of the pins 60 and 61. Through these openings in the link 58 extend the pins 62 and 63, the pin 62 extending into the arm 56 and the pin 63 extending through the other end of the arm 57 into the extension or pin 52, as shown in Fig. 3. The center of the pin 62 in the arm 56 is spaced from the center of the pin 60 a distance equal to the distance on the arm 57 between the centers of the pins 63 and 61, whereby a parallelogram will be provided by the arms 56 and 57, the link 58 and the portion of the arm 59 between the pins 60 and 61. The arm 56 extends beyond the pin 62 and is connected by the pin 64 to the plate 4. The center of the pin 64 on the plate 4 alines with the axial center of the spindle 6, as shown in Fig. 1. In tool cutting position, the center of the cutting head 48 alines with the axial center of the pin 63. When it is desired to bore a hole at a particular point in the work 9 that is concentric with the spindle 6, the center of the stylus wheel 41 must be in alinement with a line drawn through the center of the pins 63 and 64. The wear and tear on the several parts then can be tested by checking this alinement from time to time. So that the arm 59 may clear the master 35 and enable the stylus wheel 41 alone to engage the design defining edge 55, a portion of the arm 59 is offset, or as shown in the present instance the arm 59 is composed of two pieces 65 and 66, the piece 66 being secured to the piece 65 so that the piece 66 will clear the master 35 with the stylus wheel 41 pivotally connected thereto at the end thereof by the pin 67. In the embodiment shown in Figs. 1 to 4, inclusive, the arms 56 and 57 are positioned to extend below the plate 4, and the arm 59 is positioned to operate above the plate 4, the pins 60 and 61 being preferably provided with spacers 68 and 69 as shown. The portion 66 of the arm 59 is preferably provided with a handle 70 to enable the attendant to guide the stylus wheel 41 in engagement with the design defining edge 55 of the master 35. While it is conceivable that the mechanic may depend upon his sense of touch not only to maintain the stylus wheel 41 in engagement with the master 35 but also to feed the cutting tool into the work, a more uniform feed will of course be obtained if the conventional feeding bracket 71 on the conventional feed screw 72, shown in the embodiment of Figs. 5 and 6, is connected to the arm 59 by the link 73. The bracket 71 is drivingly connected to the screw 72 by the projection 172 which may be withdrawn from driven engagement with the screw 72 by lever 173, when it is desired quickly to return the bracket 71 for the start of the next operation.

In order to cut a predetermined design, if it is desired that the proportions shall be as an instance 10-to-1, that is the design defining edge 55 on the master 35 magnified ten times in longitudinal cross section to the contour of the cavity to be bored or cut, then not only must the distance between the centers of the pins 62 and 63 be one-tenth of the distance between the centers of the pins 60 and 67, but the diameter of the tool cutting head 48 must also be one-tenth of the diameter of the stylus wheel 41. In order properly to position the stylus wheel 41 it has also been found necessary as aforesaid that the distance between the pins 64 and 60 be substantially identical to the distance between the pins 60 and 67 and that the center of the pin 64 aline with the axial center of the spindle 6 and a line drawn through the centers of the pins 64, 63 and 67 be parallel to the axial center of the spindle 6, when the center of the tool cutting head 48 is in alinement not only with the axial center of the pin 63 but also with the axial center of the spindle 6.

In the embodiment shown in Figs. 5 and 6, the frame 74 of a standard lathe such as the Logan lathe has formed thereon the spacing bars 75 and 76 with the main plate 77 and 76 with the main plate 77 thereon and secured to the frame 74 by the screws 78 and 79 extending through the plate 77 and the spacing bar 75 into the bed plate of the frame 74 and the screws 80 and 81 extending through the plate 77 and spacing bar 76 into the bed plate of the frame 74. Adjacent to the spacing bar 76 there is formed the master supporting base 82 similar to the master supporting base 13 of the embodiment illustrated in Fig. 1, and therefore it will not be necessary to describe it in detail, except to state that it supports a master such as the master 83 with a design defining edge 84 to be engaged by a stylus wheel 85. The tool supporting device in this embodiment is different than the tool supporting device in the first embodiment described and consists of a base 86 which is provided with a bifurcated slot 87 to receive the pin 88 extending through the spacer 89 into the plate 77. This base 86 has secured thereon a tool receiving head 90 provided with a V-shaped slot 91 to form a seat for the shank 92 of the tool. A cross piece 93 extends across the slot 91 and is secured to the upper edges of the head 90 and is provided with a set screw 94 to pass down through the cross piece 93 into locking engagement with the shank 92. The end of the base 86 remote from the slot 87 is provided with a pin 95 which extends through one end of the arm 96 and then into one end of the short link 97, the short link 97, in the present instance, being positioned to operate in the opening 98 in the plate 77. The other end of the link 97 is connected by the pin 99 with the arm 100. One end of the arm 100 is connected by the pin 101 to one end of the arm 102. The other end of the arm 100 beyond the pin 99 is connected by the pin 103 to the plate 77 with its axis perpendicular to the axis of the spindle 104. The arms 100 and 96 are mounted to operate on the upper face of the plate 77 and in this way differ from the arms 56 and 57 of the embodiment first described. Otherwise the dimensions of the arms and the lengths thereof between their respective pins are substantially identical to corresponding parts of the arms 56, 57 and 59, and therefore a detail description of the same will not be necessary.

The plate 77 is provided with an opening to receive the master supporting base 82 as is the case with the plate 4 of the embodiment illustrated in Figs. 1 to 4, inclusive. The parts mounted on the base 82 such as the slide 105, supporting plate 106, clamping arms 107 and 108, and associated connections, are all substantially identical to the slide 29, plate 28, clamping arms 31 and 32, and their associated connections, illustrated in the embodiment of Figs. 1 to 4, inclusive, and therefore will not be described in detail.

The platform 4 in the embodiment of Figs. 1 to 4, inclusive, serves as a support for the portion 65 of the control arm 59, this portion 65 being slidably mounted on the platform 4 with the arms 56 and 57 being disposed in slidable engagement with the lower face of the platform 4. In this way the attendant is enabled with facility to guide the stylus 41 along the design edge 55 without the danger of inaccuracies that might result if the arms 56, 57 and 59 were not so supported in their slidable movement. In the embodiment illustrated in Figs. 5 and 6, the platform 77 cooperates with the arms 96 and 100 to support the arms 100, 96 and 102 in proper relationship with the master 83, the arms 100 and 96 in this embodiment being mounted to slide on the upper surface of the platform 77.

It is obvious that various changes and modifications may be made to the details of the embodiments illustrated without departing from the general spirit of the invention set forth in the appended claims.

I claim:

1. The combination of a frame having a rotatively driven work holder, a platform mounted on said frame below said work holder, a tool holder having an axis parallel to the axis of said work holder and above said platform, means for movably supporting said tool holder on said platform, a design defining master, a support for said master mounted on said platform, means for securing said master to said latter support, a stylus for engaging said master, and means below the level of said tool holder for operatively connecting said stylus to said tool holder, said connecting means including a long arm pivotally connected at one end to said bed directly below said work holder, a short arm pivotally connected to said tool holder, a link connecting said arms to one another adjacent to said tool holder, and a control arm, said stylus being operatively mounted on one end of said control arm and the other end of said control arm being pivotally connected to said long and short arms, the five connections between said bed link and three arms making possible the formation of a parallelogram well below the level of said work holder and tool holder, the axis of the stylus, pivotal connection between said short link and short arm and pivotal connection between said long arm and platform being in alinement with one another when the tool holder is positioned to bore a hole in axial alinement with the work holder.

2. The combination of a lathe having a bed, a spindle, a rotatable work holder mounted on said spindle and a feed screw parallel to said spindle and to one side of said bed, a platform mounted on said bed, a tool holder slidably mounted on and disposed above said platform, a master secured to said bed, a stylus for cooperating with said master, a pantographic device for operatively connecting said stylus to said tool holder, said pantographic device including a long arm, a short arm, a short link and a control arm, one end of the long arm being pivotally connected to said bed directly under said work holder, the other end of said long arm being pivotally connected to one end of said control arm, said stylus being connected to the other end of said control arm, one end of the short link being pivotally connected to one end of the short arm, the other end of the short link being pivotally connected to the long arm adjacent to its connection with the bed and the other end of the short arm being pivotally connected to said control arm adjacent to its connection with the long arm, said three arms and short link through their connections forming a parallelogram and being disposed above the level of said platform but well below the level of said work holder and tool holder, a bracket mounted on said feed screw, and a long link pivotally connected to said bracket and to said control arm adjacent to said stylus.

3. The combination of a lathe having a bed, a spindle, a rotatable work holder mounted on said spindle and a feed screw parallel to said spindle and to one side of said bed, a platform mounted on said bed, a tool holder slidably mounted on, and disposed above said platform, a master secured to said bed, a stylus for cooperating with said master, a pantographic device for operatively connecting said stylus to said tool holder, said pantographic device including a long arm, a short arm, a short link and a control arm, one end of the long arm being pivotally connected to said bed with its axis at right angles to the axis of said work holder and directly under said work holder, the other end of said long arm being pivotally connected to one end of said control arm, the stylus being pivotally connected to the other end of said control arm, one end of said short link being pivotally connected to one end of said short arm and also to said tool holder, the other end of said short link being pivotally connected to said long arm adjacent to its pivotal connection with said bed and the other end of said short arm being pivotally connected to said control arm adjacent to its pivotal connection with said long arm, the three arms and short link forming a parallelogram with one another and being disposed above the level of said platform but well below the level of said work holder and tool holder, the axis of the stylus, pivotal connection between said short link and short arm and pivotal connection between said long arm and platform being in alinement with one another when the tool holder is positioned to bore a hole in axial alinement with the work holder.

4. The combination of a lathe having a bed, a spindle, a rotatable work holder mounted on said spindle and a feed screw parallel to said spindle and to one side of said bed, a platform mounted on said bed, a tool holder slidably mounted on, and disposed above, said platform, a master secured to said bed, a stylus for cooperating with said master, a pantographic device for operatively connecting said stylus to said tool holder, said pantographic device including a long arm, a short arm, a short link and a control arm, one end of the long arm being pivotally connected to said bed with its axis at right angles to the axis of said work holder, the other end of said long arm being pivotally connected to one end of said control arm, the stylus being pivotally connected to the other end of said control arm, one end of said short link being pivotally connected to one end of said short arm and also to said tool holder, the other end of said short link being pivotally connected to said long arm adjacent to its pivotal connection with said bed and the other end of said short arm being pivotally connected to said control arm adjacent to its pivotal connection with said long arm, the three arms and short link forming a parallelogram with one another, the axis of the stylus, pivotal connection between said short link and short arm and pivotal connection between said long arm and platform being in alinement with one another when the tool holder is positioned to bore a hole in axial alinement with the work holder, a bracket on said feed screw, a projection operatively mounted on said bracket to engage the threads of said screw, a lever operatively connected to said projection and bracket to withdraw said projection from driven engagement with said screw, and a long link pivotally connected at one end to said bracket and pivotally connected at its other end to said control arm adjacent to said stylus.

5. The combination of a lathe having a bed and a rotatable work holder, a platform mounted on said bed below said work holder, a tool holder movably mounted on said platform and having an axis substantially parallel to the axis of said work holder and disposed above said platform, a master secured to said platform, a stylus engaging said master to cooperate therewith, and a pantographic device below the level of said tool holder operatively connecting said stylus to said tool holder, said pantographic device including a long arm, a short arm, a short link and a control arm, the long arm and short arm being slidably mounted in engagement with the lower face of said platform, the control arm being slidably mounted in engagement with the upper face of said platform, one end of said long arm being pivotally connected to said bed directly below said work holder and the other end being pivotally connected to one end of said control arm, the stylus being pivotally connected on the other end of said control arm, one end of said short link being pivotally connected to one end of said short arm, the other end of said short link being pivotally connected to said long arm adjacent to its connection with the bed and the other end of said short arm being pivotally connected with said control arm adjacent to its connection with said long arm.

6. The combination of a lathe having a bed and a rotatable work holder, a platform mounted on said bed below said work holder, a tool holder slidably mounted on said platform and disposed above said platform, a master secured to said bed, a stylus engaging said master to cooperate therewith, and a pantographic device below the level of said tool holder and work holder operatively connecting said stylus with said tool holder, said pantographic device including a long arm, a short link and a control arm, the long arm and short arm being slidably mounted on said platform, one end of said long arm being pivotally connected to said bed directly below said work holder, the other end of said long arm being pivotally connected to one end of said control arm, the stylus being mounted on the other end of said control arm, one end of said short link being pivotally connected to one end of said short arm, the other end of said short link being pivotally connected to said long arm adjacent to its connection with said bed and the other end of said short arm being pivotally connected to said control arm adjacent to its connection with said long arm, said three arms and short link forming a parallelogram with one another well below the level of said tool holder and work holder, the axis of the stylus, pivotal connection between said short link and short arm and pivotal connection between said long arm and platform being in alinement with one another when the tool holder is positioned to bore a hole in axial alinement with the work holder.

7. The combination of a frame having a platform, a tool holder slidably mounted on the platform relative to a rotatable work holder; a master secured to the frame; a stylus cooperating with said master; a pantographic device for operatively connecting said stylus to said tool holder, said pantographic device including a long arm, a short arm, a short link and a control arm, one end of the long arm being pivotally connected to the frame directly under the work holder, the other end of said long arm being pivotally connected to one end of said control arm, said stylus being connected to the other end of said control arm, one end of the short link being pivotally connected to one end of the short arm, the other end of the short link being pivotally connected to the long arm adjacent to its connection with the frame and the other end of the short arm being pivotally connected to said control arm adjacent to its connection with the long arm, said three arms and short link through their connections forming a parallelogram and being disposed above the level of the frame but well below the level of said tool holder; a bracket mounted on a feed screw adjacent to the platform; and a long link pivotally connected to said bracket and to said control arm adjacent to said stylus.

8. The combination of a frame having a platform, a tool holder slidably mounted on the platform relative to a rotatable work holder; a master secured to the frame; a stylus cooperating with said master; a pantographic device for operatively connecting said stylus to said tool holder, said pantographic device including a long arm, a short arm, a short link and a control arm, one end of the long arm being pivotally connected to the frame with its axis at right angles to the axis of the work holder and directly under the work holder, the other end of said long arm being pivotally connected to one end of said control arm; the stylus being pivotally connected to the other end of said control arm; one end of said short link being pivotally connected to one end of said short arm and also to said tool holder, the other end of said short link being pivotally connected to said long arm adjacent to its pivotal connection with the frame and the other end of said short arm being pivotally connected to said control arm adjacent to its pivotal connection with said long arm, the three arms and short link forming a parallelogram with one another and being disposed above the level of the platform but well below the level of said tool holder; and the axis of the stylus, pivotal connection between said short link and short arm and pivotal connection between said long arm and frame being in alinement with one another when the tool holder is positioned to bore a hole in axial alinement with the work holder.

9. The combination of a frame having a platform, a rotatable work holder disposed above the level of said platform, a tool holder movably mounted on said platform and having its axis substantially parallel to the axis of the work holder and disposed above said platform; a master secured to said frame; a stylus engaging said master to cooperate therewith; and a pantographic device below the level of said tool holder operatively connecting said stylus to said tool holder, said pantographic device including a long arm, a short arm, a short link and a control arm, the long arm and short arm being slidably mounted in engagement with the lower face of said platform, the control arm being slidably mounted in engagement with the upper face of said platform, one end of said long arm being pivotally connected to said platform directly below the work holder and the other end being pivotally connected to one end of said control arm, the stylus being pivotally connected on the other end of said control arm, one end of said short link being pivotally connected to one end of said short arm, the other end of said short link being pivotally connected to said long arm adjacent to its connection with the frame and the other end of said short arm being pivotally connected with said control arm adjacent to its connection with said long arm.

10. The combination of a frame having a platform, a tool holder slidably mounted on the platform relative to a rotatable work holder; a master secured to the frame; a stylus cooperating with said master; a pantographic device for operatively connecting said stylus to said tool holder, said pantographic device including a long arm, a short arm, a short link and a control arm, one end of the long arm being pivotally connected to the frame with its axis at right angles to the axis of the work holder and adjacent to the work holder, the other end of said long arm being pivotally connected to one end of said control arm; the stylus being pivotally connected to the other end of said control arm; one end of said short link being pivotally connected to one end of said short arm and also to said tool holder, the other end of said short link being pivotally connected to said long arm adjacent to its pivotal connection with the frame and the other end of said short arm being pivotally connected to said control arm adjacent to its pivotal connection with said long arm, the three arms and short link forming a parallelogram with one another, and the axis of the stylus, pivotal connection between said short link and short arm and pivotal connection between said long arm and frame being in alinement with one another when the tool holder is positioned to bore a hole in axial alinement with the work holder.

RAPHAEL ATTI.